US012437711B2

(12) United States Patent
An

(10) Patent No.: US 12,437,711 B2
(45) Date of Patent: Oct. 7, 2025

(54) LUMINANCE UNIFORMITY COMPENSATING SYSTEM AND METHOD

(71) Applicant: LG Display Co., Ltd., Seoul (KR)

(72) Inventor: Sung Ho An, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/738,505

(22) Filed: Jun. 10, 2024

(65) Prior Publication Data

US 2025/0140165 A1 May 1, 2025

(30) Foreign Application Priority Data

Nov. 1, 2023 (KR) ........................ 10-2023-0148890

(51) Int. Cl.
*G09G 3/32* (2016.01)
*G06T 7/00* (2017.01)
*G09G 3/20* (2006.01)

(52) U.S. Cl.
CPC ............. *G09G 3/32* (2013.01); *G06T 7/0004* (2013.01); *G09G 3/2096* (2013.01); *G06T 2207/30121* (2013.01); *G09G 2320/0233* (2013.01)

(58) Field of Classification Search
CPC ............... G09G 3/2092; G09G 3/2096; G09G 3/32–3291; G09G 2310/0243; G09G 2310/0248; G09G 2310/0251; G09G 2310/06; G09G 2310/08; G09G 2320/02; G09G 2320/0233; G09G 2320/0242; G09G 2320/0271; G09G 2320/0276; G09G 2320/0285–0295; G09G 2320/0626; G09G 2320/0686; G09G 2320/0693; G09G 2330/10; G06T 7/0004; G06T 2207/30121
See application file for complete search history.

(56) References Cited

U.S. PATENT DOCUMENTS

2018/0088885 A1* 3/2018 Deng .................. G09G 3/3208
2019/0197935 A1* 6/2019 Kim ....................... G09G 3/006
2020/0211502 A1* 7/2020 Kim ....................... G09G 3/006
2021/0035513 A1* 2/2021 Chang .................. G09G 3/3607
2021/0181583 A1 6/2021 Kim et al.
2023/0162650 A1* 5/2023 Zhang ...................... G09G 3/20 345/55
2023/0316971 A1 10/2023 Kim et al.

FOREIGN PATENT DOCUMENTS

KR 10-2019-0050212 A 5/2019
KR 10-2022-0041552 A 4/2022
KR 10-2023-0098666 A 7/2023

* cited by examiner

*Primary Examiner* — Nathan Danielsen
(74) *Attorney, Agent, or Firm* — Morgan, Lewis & Bockius LLP

(57) ABSTRACT

A luminance uniformity compensation system includes a display device having a display panel; a camera configured to generate picture data by capturing the display panel and extracting luminance data of the display panel from the picture data; and a uniformity compensation device configured to generate block compensation data of a unit block and priority pixel compensation data of a priority pixel of the unit block from the luminance data of the display panel and transmitting the block compensation data and the priority pixel compensation data to the display device, wherein the unit block includes a block of pixels defined within the display panel, and wherein the priority pixel includes a pixel having one of a dark spot or a bright spot.

18 Claims, 16 Drawing Sheets

Unit Block Compensation Data
(M X N Pixel)

| | | | | | |
|---|---|---|---|---|---|
| -50 | -50 | -50 | -50 | -50 | -50 |
| -50 | -50 | -50 | -50 | -50 | -50 |
| -50 | -50 | -50 | -50 | -50 | -50 |
| -50 | -50 | -50 | -50 | -50 | -50 |
| -50 | -50 | -50 | -50 | -50 | -50 |
| -50 | -50 | -50 | -50 | -50 | -50 |
| -50 | -50 | -50 | -50 | -50 | -50 |
| -50 | -50 | -50 | -50 | -50 | -50 |

Total Luminance: 800
Unit Block Average Luminance: 850

Unit Block Compensation Data
= Total Luminance – Unit Block Average Luminance

*FIG.8*

Pixel Compensation Data
(M X N Pixel)

| | | | | | |
|---|---|---|---|---|---|
| 20 | 30 | 20 | 40 | 30 | 40 |
| 10 | 20 | 0 | -10 | 10 | -20 |
| -10 | -20 | 20 | 10 | 30 | -10 |
| -10 | -20 | -100 | -50 | 20 | -20 |
| 0 | -30 | -90 | -40 | 30 | 0 |
| ⋮ | | | | | |
| | | | | | |
| | | | | | |

Pixel Compensation Data
= Total Luminance – Pixel Luminance

*FIG.9*

LUMINANCE UNIFORMITY COMPENSATING SYSTEM AND METHOD

CROSS-REFERENCE TO RELATED APPLICATION

This application claims priority from Korean Patent Application No. 10-2023-0148890, filed on Nov. 1, 2023, which is hereby incorporated by reference for all purposes as if fully set forth herein.

BACKGROUND

Technical Field

Embodiments of the disclosure relate to a luminance uniformity compensation system and method, and more particularly, to a luminance uniformity compensation system and method capable of enhancing uniformity compensation capability for a singular point using a unit profile for luminance uniformity compensation of a display device.

Discussion of the Related Art

With the development of the information society, various needs for display devices that display images are increasing, and various types of display devices, such as liquid crystal displays LCDs, organic light emitting displays OLEDs, etc. are being utilized. Among them, the liquid crystal display device which does not adopt a self-luminous scheme requires a backlight unit disposed at a lower portion (rear surface) of the liquid crystal display device to emit light. The addition of the backlight unit may increase the thickness of the liquid crystal display device, limit the implementation of the display device in various types of designs, such as flexible or circular, and reduce luminance and response speed.

Meanwhile, a display device having self-luminous elements may be implemented to be thinner than a display device having a built-in light source, and may implement a flexible and foldable display device. Display devices, having such self-luminous elements, include organic light emitting display devices including an organic material in the light emitting layer, micro LED display devices using micro LED elements as light emitting elements, and the like. Such an organic light emitting display device or a self-luminous device, such as a micro LED display device may be used as a thinner or more diverse display device because it does not require a separate light source.

The display panel constituting the display device may have an uneven distribution of luminance and colors due to various causes. For example, the peripheral portion may look relatively dark compared to the center, or the color of the entire screen may not be evenly visible. This phenomenon is called non-uniformity. The non-uniformity of the display panel may occur due to a difference between the light source driver chips, a welding problem of the light source modules, flatness issues with module assembly, a difference in the position of the central axis of the light source, and the like.

Accordingly, the manufacturing process of the display device includes a process of manufacturing the display device and a process of inspecting and compensating for luminance uniformity of the completed display panel. Recently, in compensating for luminance uniformity of a display panel, the importance of a technology for accurately detecting and compensating for a singular point, such as a black spot or a white spot, has been highlighted.

SUMMARY

Accordingly, embodiments of the present disclosure are directed to a luminance uniformity compensation system and method that substantially obviate one or more of the problems due to limitations and disadvantages of the related art.

An aspect of the present disclosure is to provide a luminance uniformity compensation system and method capable of compensating for luminance for a singular point while reducing the amount of luminance compensation data.

Another aspect of the present disclosure is to provide a luminance uniformity compensation system and method capable of compensating for luminance for a singular point using compensation data of a unit block and pixel compensation data of a priority.

Another aspect of the present disclosure is to provide a luminance uniformity compensation system and method capable of luminance compensation for a singular point by generating pixel compensation data of a priority using a smaller unit profile than a unit block.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a luminance uniformity compensation system comprises a display device having a display panel; a camera configured to generate picture data by capturing the display panel and extracting luminance data of the display panel from the picture data; and a uniformity compensation device configured to generate block compensation data of a unit block and priority pixel compensation data of a priority pixel of the unit block from the luminance data of the display panel and transmitting the block compensation data and the priority pixel compensation data to the display device, wherein the unit block includes a block of pixels defined within the display panel, and wherein the priority pixel includes a pixel having one of a dark spot or a bright spot.

In another aspect, a uniformity compensation device comprises a compensation data generator configured to generate block compensation data of a unit block and priority pixel compensation data of a priority pixel from luminance data of a display panel of a display device; a communication module configured to transmit the block compensation data and the priority pixel compensation data to the display device; and a controller configured to control the compensation data generator and the communication module, wherein the unit block includes a block of pixels defined within the display panel, and wherein the priority pixel includes a pixel among the block of pixels having one of a dark spot or a bright spot.

In another aspect, a luminance uniformity compensation method, comprises extracting luminance data of each unit profile of a unit block from luminance data of a display panel, wherein the unit block includes a block of pixels defined within the display panel, wherein the unit block is comprised of a plurality of unit profiles, wherein each unit profile is smaller than the unit block, and wherein the unit block includes M×N pixels, and M and N are natural numbers larger than or equal to 2; generating deviation data of each unit profile by comparing luminance data between the unit profiles of the plurality of unit profiles; and generating the priority pixel compensation data of a priority pixel from the deviation data of the unit profiles, wherein the priority pixel includes a pixel among the block of pixels having one of a dark spot or a bright spot.

According to embodiments of the disclosure, it is possible to compensate for luminance for a singular point while reducing the amount of luminance compensation data.

According to embodiments of the disclosure, it is possible to compensate for luminance uniformity with low power by reducing the amount of luminance compensation data.

According to embodiments of the disclosure, it is possible to compensate for luminance for a singular point using compensation data of a unit block and pixel compensation data of a priority.

According to embodiments of the disclosure, it is possible to compensate for luminance for a singular point by generating pixel compensation data of a priority using a unit profile smaller than a unit block.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 8 is a view illustrating a process of generating compensation data of a unit block in a luminance uniformity compensation method according to embodiments of the disclosure;

FIG. 9 is a view illustrating a process of generating compensation data of individual pixels in a luminance uniformity compensation method according to embodiments of the disclosure;

DETAILED DESCRIPTION

Figure 1:
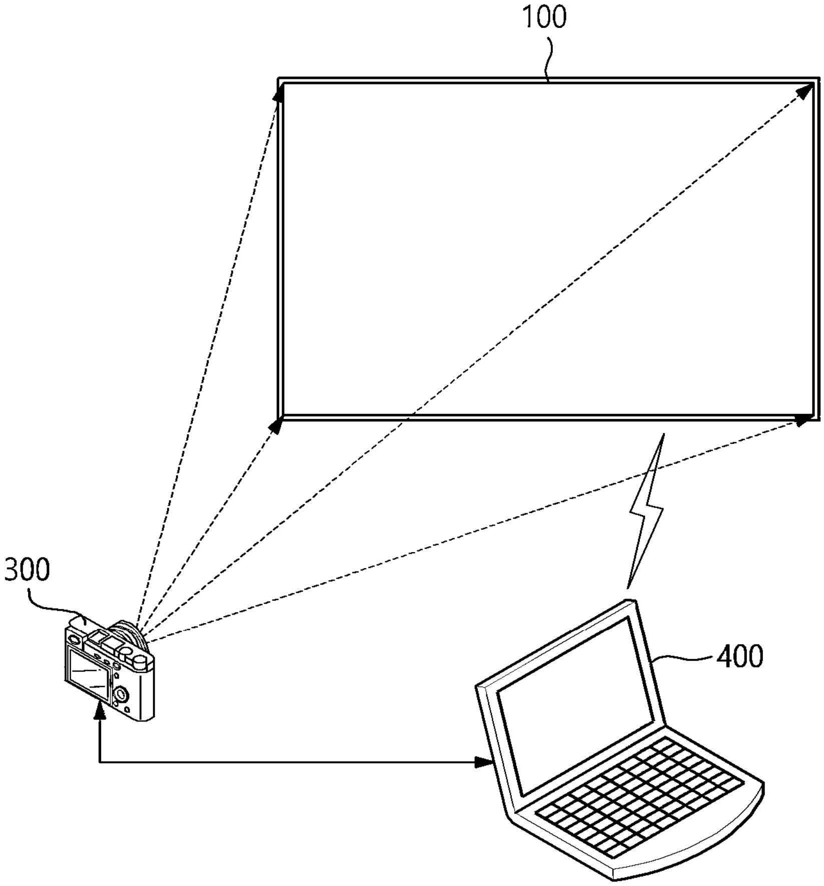
FIG. 1 is a view illustrating an example configuration of a luminance uniformity compensation system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms, such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to,"

"contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the disclosure will be described in detail with reference to the accompanying drawings.

FIG. 1 is a view illustrating an example configuration of a luminance uniformity compensation system according to embodiments of the disclosure.

With reference to FIG. 1, a luminance uniformity compensation system according to embodiments of the disclosure may include a display device 100, a camera device 300, and a uniformity compensation device 400.

The display device 100 is a device that displays an image through a display panel. The display device 100 may be one of various types of devices, such as micro LED displays, liquid crystal displays, organic light emitting diode displays, or plasma display panels.

The camera device 300 is a device that generates a panel image by capturing the display panel of the display device 100 through a camera. The camera device 300 may be implemented as a vision camera, a CCD camera, an optical camera, an infrared camera, or an image sensor, but is not limited thereto, and various image capturing devices capable of capturing an image may be used.

To capture the luminance of the display device 100, a picture, such as a test pattern, may be displayed on the display device 100. The camera device 300 may generate a panel image by capturing the test pattern displayed on the display device 100, and provide the same to the uniformity compensation device 400.

The camera device 300 may be manually controlled by the user to perform capturing of the display device 100, but may also be automatically captured under the control of the uniformity compensation device 400. In this case, the camera device 300 may be implemented in a fixed form, such as a jig or a tripod.

Meanwhile, the camera device 300 may further include a luminance detector capable of detecting luminance data from the panel image obtained by capturing the display device 100 or detecting luminance data from the test pattern displayed on the display device 100. In this case, the camera device 300 may detect luminance data from the panel image of the display device 100 and provide the detected luminance data to the uniformity compensation device 400.

Figure 2:
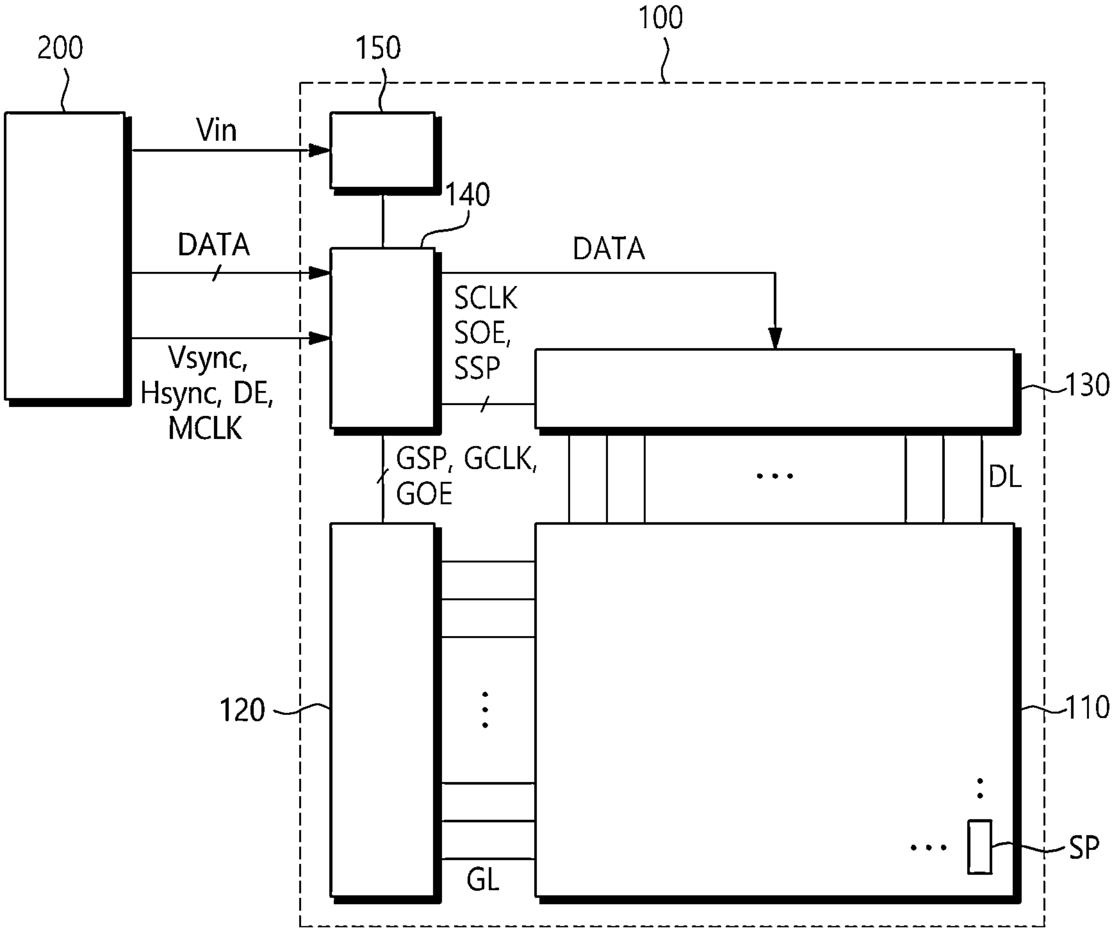
FIG. 2 is a diagram schematically illustrating a configuration of a display device in a luminance uniformity compensation system according to embodiments of the disclosure.

FIG. 2 is a diagram schematically illustrating a configuration of a display device in a luminance uniformity compensation system according to embodiments of the disclosure.

With reference to FIG. 2, in a luminance uniformity compensation system according to embodiments of the disclosure, a display device 100 according to embodiments of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image, in the display area, based on a gate signal transferred from the gate driving circuit 120 through the plurality of gate line GLs GL and the data voltage transferred from the data driving circuit 130 through the plurality of data lines DL. The gate signals transferred from the gate driving circuit 120 may include a scan signal used as a control signal for driving the subpixel, a light emitting signal used as a control signal for the light emitting operation of the light emitting element, or a sensing signal used as a control signal for sensing the voltage of a specific node.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include a thin film transistor (TFT) formed in an area where one data line DL and one gate line GL intersect, a light emitting element, such as a micro LED, that emits light according to a data voltage, a storage capacitor electrically connected to the light emitting element to maintain a voltage, and the like.

For example, when the display device 100 having a resolution of 2,800×1,290 includes four subpixels SP of red R), green G), and blue B), 1,290 data lines DL may be connected to 2,800 gate lines GL and three subpixels RGB, and thus, there may be provided 1,290×3=3,870 data lines DL. Each subpixel SP is disposed at the intersection between the gate line GL and the data line DL.

The gate driving circuit 120 may be controlled by the timing controller 140 to sequentially output gate signals to the plurality of gate lines GL disposed in the display panel 110, controlling the driving timing of the plurality of subpixels SP.

In the display device 100 having a resolution of 2.800×1.290, sequentially outputting the gate signal to the 2,800 gate lines GL from the first gate line to the 2,160th gate line may be referred to as 2,800-phase driving. Or, when gate signals are sequentially output on a per-four gate line GL basis, like when gate signals are sequentially output from the first gate line to the fourth gate line and then gate signals are sequentially output from the fifth gate line to the eight gate line, may be referred to as four-phase driving. In other words, when gate signals are sequentially output every A gate lines GL may be referred to as A-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the gate signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. For example, the timing controller 140 may control the gate driving circuit 120 to output a gate signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the gate signal. The gate output enable signal GOE designates timing information about one or more gate driving integrated circuits GDICs.

The timing controller 140 outputs various data control signals including, e.g., a source start pulse SSP, a source clock SCLK, and a source output enable signal SOE, to control the data driving circuit 130. The source start pulse SSP controls the timing at which one or more source driving integrated circuits SDIC constituting the data driving circuit 130 start data sampling. The source clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied. The power management circuit 150 adjusts the direct current (DC) input voltage Vin supplied from the host system 200, generating power required to drive the display panel 100, the gate driving circuit 120, and the data driving circuit 130.

The subpixel SP is positioned at the intersection between the gate line GL and the data line DL, and a light emitting element may be disposed in each subpixel SP. For example, the micro LED display device may include a light emitting element, such as a micro LED, in each subpixel SP and may display an image by controlling the current flowing to the light emitting element according to the data voltage.

The display device 100 may be one of various types of devices, such as micro LED displays, liquid crystal displays, organic light emitting diode displays, or plasma display panels.

Figure 3:
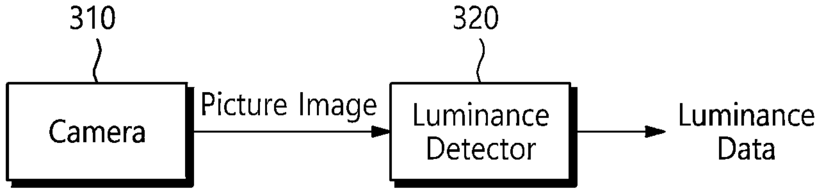
FIG. 3 is a view schematically illustrating a configuration of a camera device in a luminance uniformity compensation system according to embodiments of the disclosure.

FIG. 3 is a view schematically illustrating a configuration of a camera device in a luminance uniformity compensation system according to embodiments of the disclosure.

With reference to FIG. 3, in the luminance uniformity compensation system according to embodiments of the disclosure, the camera device 300 may include a camera module 310 and a luminance detector 320. The camera module 310 may generate a picture image by capturing the display area that emits light from the display device 100. The luminance detector 320 may detect luminance data corresponding to each pixel of the display panel 110 from the picture image transferred from the camera module 310.

However, as described above, the luminance detector 320 may not be included in the camera device 300, but may be included in the uniformity compensation device 400. In this case, the camera device 300 may include only the camera module 310, and may transmit the picture image generated by the camera module 310 to the uniformity compensation device 400.

Figure 4:
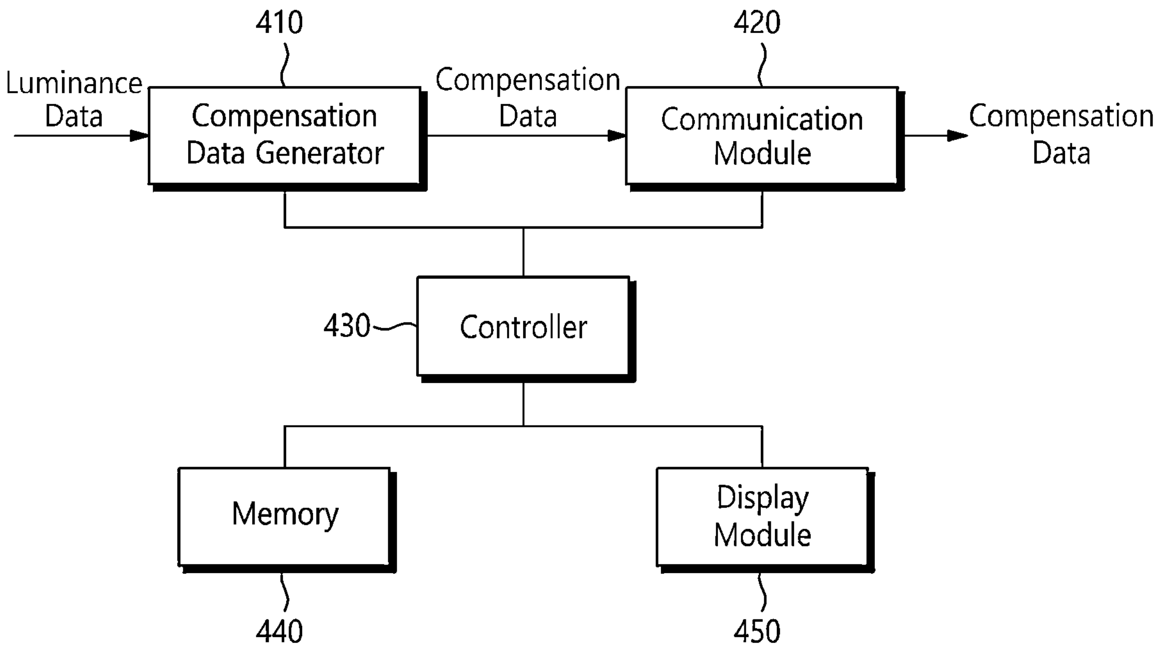
FIG. 4 is a view schematically illustrating a configuration of a uniformity compensation device in a luminance uniformity compensation system according to embodiments of the disclosure.

FIG. 4 is a view schematically illustrating a configuration of a uniformity compensation device 400 in a luminance uniformity compensation system according to embodiments of the disclosure.

With reference to FIG. 4, in the luminance uniformity compensation system according to embodiments of the disclosure, the uniformity compensation device 400 may include a compensation data generator 410, a communication module 420, a controller 430, a memory 440, and a display module 450. The compensation data generator 410 may generate compensation data for compensating for the luminance of the display device 100 from the luminance data transmitted from the camera device 300.

However, as described above, when the luminance detector 320 is disposed inside the compensation data generator 410 of the uniformity compensation device 400, the luminance detector may receive picture data obtained by capturing the display panel 110 from the camera device 300 and detect luminance data corresponding to each pixel of the display panel 110.

The compensation data generator 410 may generate compensation data used to compensate for the luminance of the display panel 110 in the display device 100 using the luminance data corresponding to each pixel of the display panel 110. The compensation data generator 410 generates compensation data under the control of the controller 430, and the process of generating the compensation data is described below in detail.

The communication module 420 transmits the compensation data generated by the compensation data generator 410 to the display device 100 under the control of the controller 430. The communication module 420 may be a wired communication module or a wireless communication module.

The memory 440 may store picture data or luminance data transmitted from the camera device 300, and the picture data or luminance data stored in the memory 440 is used by the compensation data generator 410 to generate compensation data. The display module 450 may display a screen for generating compensation data and may receive a user input, such as a touch.

The uniformity compensation device 400 may be implemented using an electronic circuit, which may be included in a computer or a processor.

Figure 5:
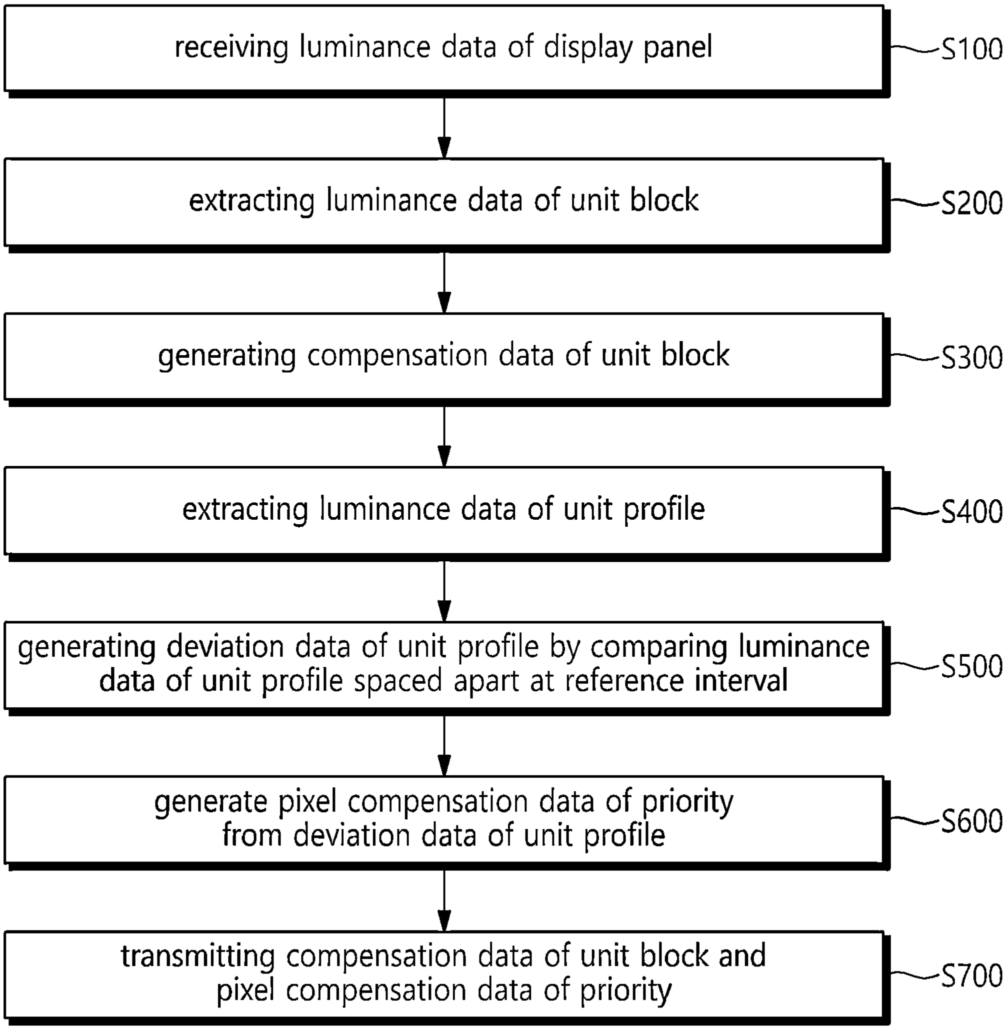
FIG. 5 is a flowchart illustrating a luminance uniformity compensation method according to embodiments of the disclosure.

FIG. 5 is a flowchart illustrating a luminance uniformity compensation method according to embodiments of the disclosure.

With reference to FIG. 5, a luminance uniformity compensation method according to embodiments of the disclosure may include a step S100 of receiving luminance data of a display panel, a step S200 of extracting luminance data of a unit block, a step S300 of generating compensation data of the unit block, a step S400 of extracting luminance data of a unit profile, a step S500 of generating deviation data of the unit profile by comparing luminance data of the unit profile spaced apart at a reference interval, a step S600 of generating pixel compensation data of a priority from the deviation data of the unit profile, and a step S700 of transmitting the compensation data of the unit block and the pixel compensation data of the priority.

The step S100 of receiving the luminance data of the display panel is a process of receiving the luminance data of the display panel from the camera device 300 or detecting the luminance data of the display panel from the picture data received from the camera device 300. As described above, when the luminance detector is included in the uniformity compensation device 400, luminance data corresponding to each pixel of the display panel 110 may be detected from the picture data received from the camera device 300.

The step S200 of extracting the luminance data of the unit block is a process of splitting the entire area of the display panel 110 into a plurality of unit blocks and extracting the luminance data corresponding to the unit block. The size of the unit block may be determined considering the size of the display panel 110 on which the luminance compensation is performed, the memory size of the display device 100 receiving the data for the luminance compensation, and the data processing performance of the display device 100. The size of the unit block may include M (which is a natural number) horizontal rows and N (which is a natural number) vertical columns, in which case the unit block may have a size of M×N pixels.

Figure 6:
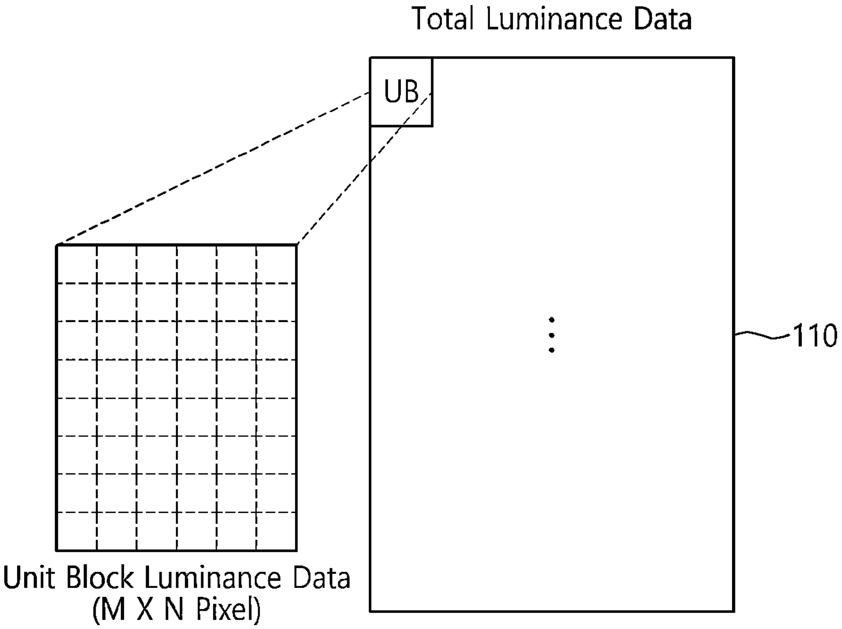
FIG. 6 is a view illustrating a concept of splitting a display panel into unit blocks in a luminance uniformity compensation method according to embodiments of the disclosure.
Figure 7:
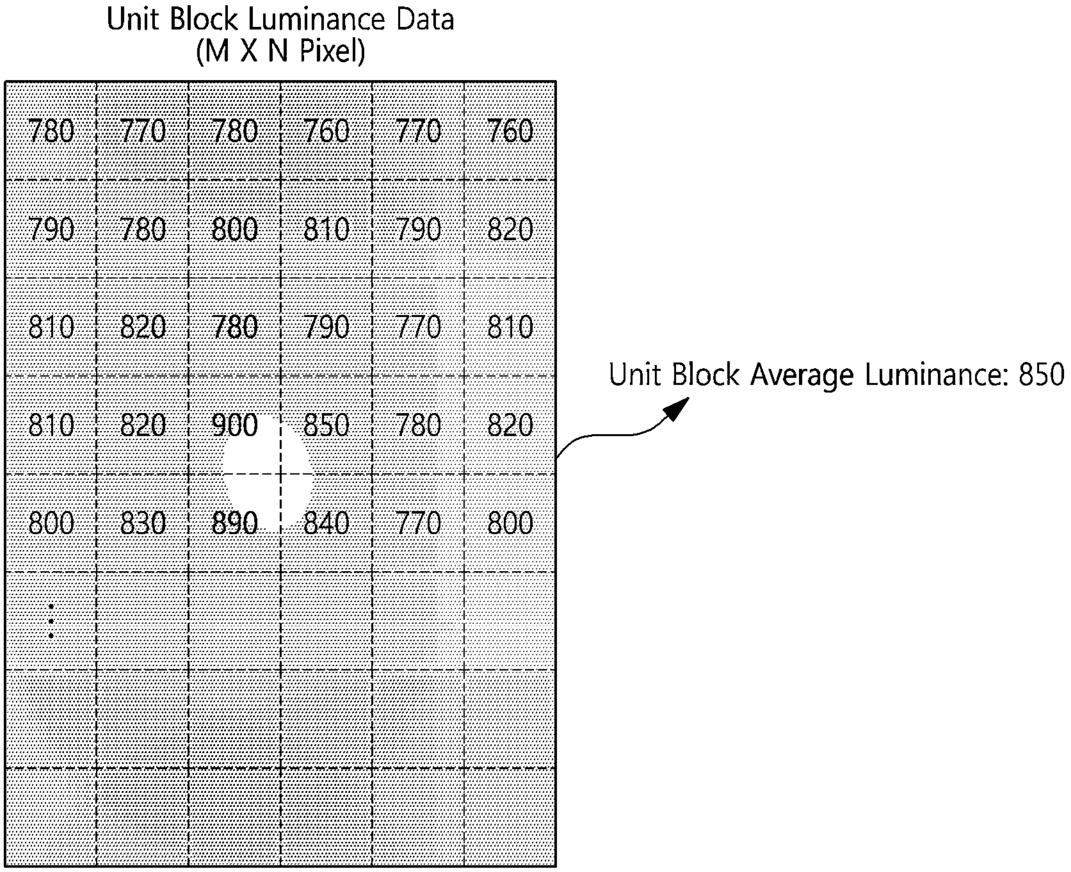
FIG. 7 is a view illustrating a process of extracting luminance data of a unit block in a luminance uniformity compensation method according to embodiments of the disclosure.

FIG. 6 is a view illustrating a concept of splitting a display panel into unit blocks in a luminance uniformity compensation method according to embodiments of the disclosure, and FIG. 7 is a view illustrating a process of extracting luminance data of a unit block in a luminance uniformity compensation method according to embodiments of the disclosure.

With reference to FIGS. 6 and 7, a display device 100 according to embodiments of the disclosure may include a display panel 110 having a resolution of 2,800×1,290 pixels.

For example, for the display panel 110 having a resolution of 2,800×1,290 pixels, the unit block UB may be set to a size of 8×6 pixels. When the unit block UB has a size of 8×6 pixels, the display panel 110 having a resolution of 2,800×1,290 pixels may be split into 350×215 unit blocks UB.

As described above, when the luminance data for the display panel 110 is split into unit blocks UB, 2,800×1,290 pieces of pixel compensation data may be reduced to 350×215 pieces of unit block compensation data, and thus, the processing speed and performance of the display device 100 may be increased.

The luminance data of the unit block may include luminance value for each pixel in the unit block UB having an array of M×N pixels. The luminance value for each pixel may be expressed in nits. For example, pixels in the first row and the first column in the unit block may represent a luminance value of 780 nits, and pixels in the first row and the second column in the unit block may represent a luminance value of 770 nits.

In this case, the average luminance value of the unit block may be determined as an average of all luminance values corresponding to the unit block. In this case, the average luminance value (e.g., 850 nits) of the unit block may be calculated by summing all the luminance values of the 8×6 pixels and dividing the sum by 48, which is the total number of pixels.

The step S300 of generating the compensation data of the unit block is a process of generating the compensation data for the unit block by comparing the luminance value of the unit block with the total luminance value of the display panel 110. To that end, the average luminance value of the unit block and the average luminance value of the display panel 110 may be compared.

FIG. 8 is a view illustrating a process of generating compensation data of a unit block in a luminance uniformity compensation method according to embodiments of the disclosure.

With reference to FIG. 8, in the luminance uniformity compensation method according to the embodiments of the disclosure, the compensation data of the unit block may be determined as a difference value between the overall average luminance value for the entire area of the display panel 110 and the average luminance value of the unit block. For example, when the average luminance value for the entire area of the display panel 110 is 800 nits and the average luminance value of the first unit block is 850 nits, the compensation data of the first unit block may be 800−850=−50 nits. The compensation data (e.g., −50 nits) of the unit block is equally applied to all the pixels in the corresponding unit block.

The compensation data of each pixel may be generated in the same manner as the method for generating compensation data of the unit block for individual compensation for a singular point having a large luminance deviation due to a dark spot or a bright spot, such as a black spot or a white spot.

FIG. 9 is a view illustrating a process of generating compensation data of individual pixels in a luminance uniformity compensation method according to embodiments of the disclosure.

With reference to FIG. 9, in the luminance uniformity compensation method according to embodiments of the disclosure, the compensation data of the individual pixels may be determined as a value obtained by subtracting the luminance value of each pixel from the overall average luminance value for the entire area of the display panel 110. For example, when the average luminance value for the entire area of the display panel 110 is 800 nits, the pixel compensation data of FIG. 9 may be calculated by subtracting the luminance value of each pixel illustrated in FIG. 7.

As such, it may be most accurate (or at least more accurate) to compensate for the luminance of the display device 100 according to the compensation data of the individual pixels. However, when the display device 100 does not have enough memory to store compensation data of all the pixels and compensates for the luminance of the display panel 110 by reflecting the compensation data of all the pixels, the display device 100 requires a large amount of time and a long process.

Accordingly, it may be effective to compensate for the luminance based on the unit block while performing compensation on a per-pixel basis only for a singular point, such as a black spot or a white spot. To detect a singular point, the difference between the average luminance value of the unit block and the luminance value of the individual pixel may be considered.

Figure 10:
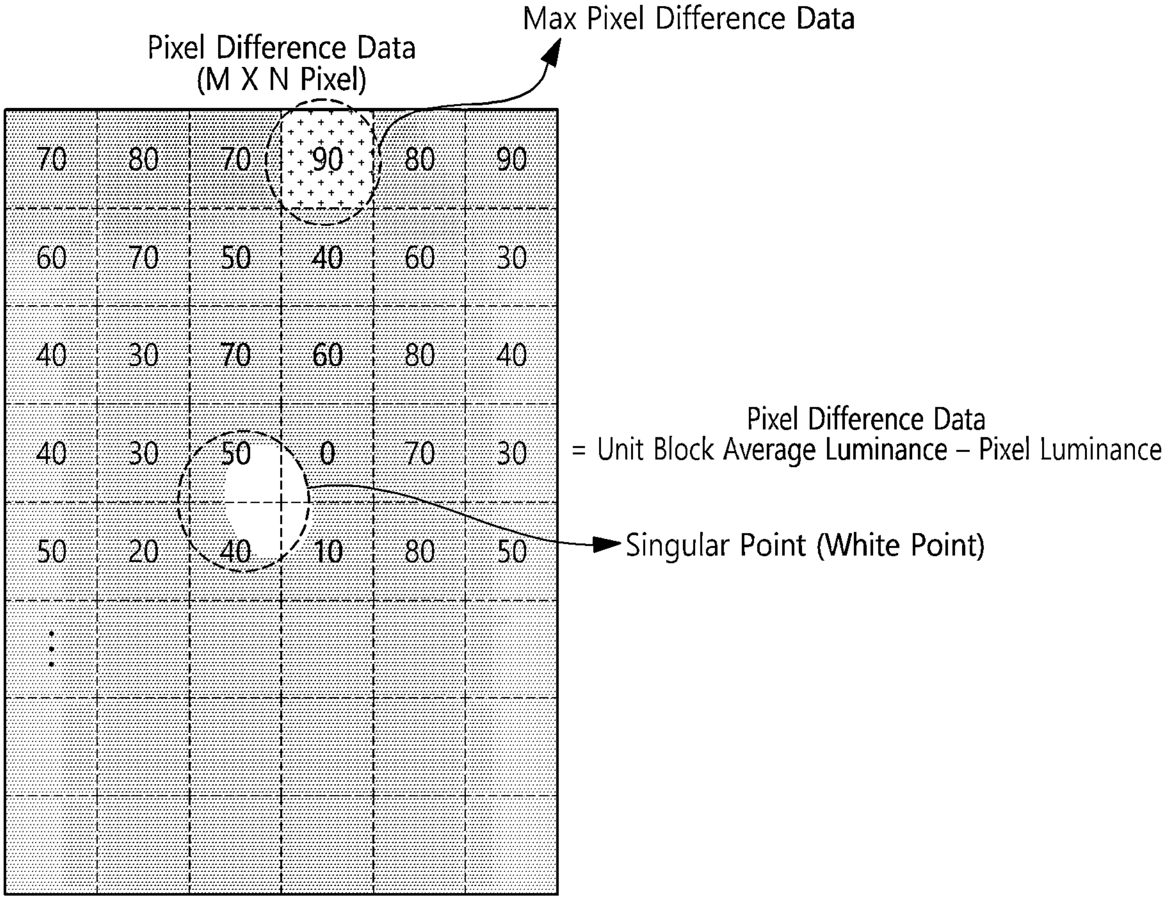
FIG. 10 illustrates an example of calculating a difference between an average luminance value of a unit block and a luminance value of individual pixels as pixel deviation data.

FIG. 10 illustrates an example of calculating a difference between an average luminance value of a unit block and a luminance value of individual pixels as pixel deviation data.

With reference to FIG. 10, to detect a singular point, such as the black spot or the white spot, the difference between the average luminance value of the unit block and the luminance value of individual pixels may be calculated as pixel deviation data. However, when the difference between the average luminance value of the unit block and the luminance value of the individual pixels is calculated as pixel deviation data, an error in determining the singular point may occur due to the average luminance value of the unit block.

For example, when the difference between the average luminance value (e.g., 850 nits) of the unit block and the luminance value of the individual pixels is calculated as pixel deviation data, the pixel deviation data of the fourth column and the first row may show the maximum value. However, the actual singular point (white spot) may be positioned in the pixel of the third column and the fourth row or the pixel of the third column and the fifth row, and thus may be different from the pixel deviation data. This is because the average luminance value of the unit block reflects luminance values for all the pixels in the unit block regardless of the singular point, and thus the average luminance value of the unit block may be close to the luminance value of the singular point.

To resolve such an error, the luminance uniformity compensation method according to the disclosure may select a unit profile having a predetermined direction and size within a unit block, compare luminance data of the unit profile according to a predetermined interval, and generate deviation data, thereby more accurately detecting a singular point, such as a black spot or a white spot, while reducing the amount of luminance compensation data transmitted to the display device 100.

The step S400 of extracting the luminance data of the unit profile is a process of selecting a specific area in the unit block as a unit profile and extracting the luminance data included in the unit profile.

Figure 11:
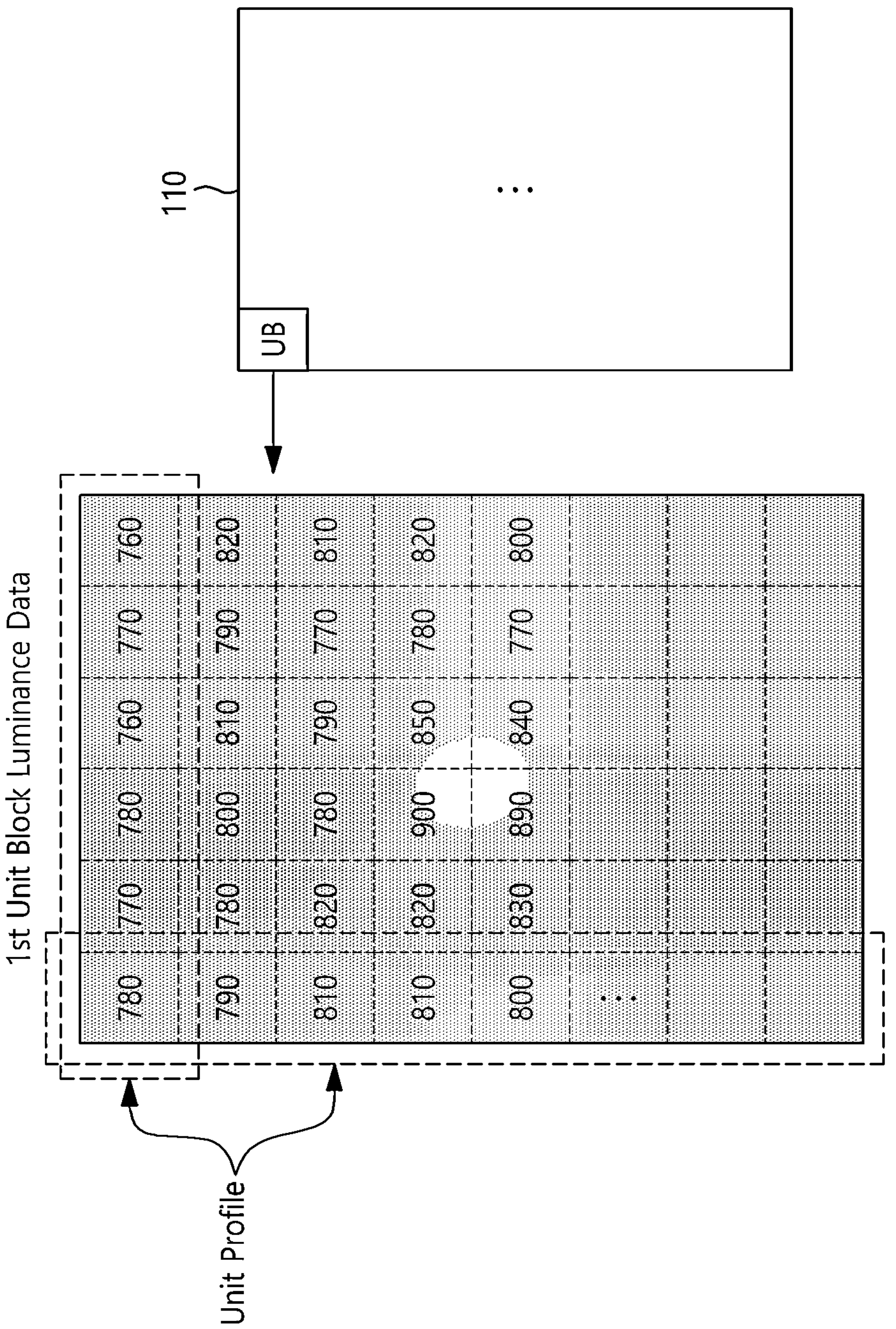
FIG. 11 illustrates a process of extracting luminance data of a unit profile in a luminance uniformity compensation method according to embodiments of the disclosure.

FIG. 11 illustrates a process of extracting luminance data of a unit profile in a luminance uniformity compensation method according to embodiments of the disclosure.

With reference to FIG. 11, in the luminance uniformity compensation method according to embodiments of the disclosure, a unit profile may be selected as a pixel in one row or a pixel in one column from a unit block of M×N pixels.

For example, the unit profile may be selected as M×1 pixels in the column direction from a first unit block UB1 of M×N pixels. When the first unit block UB1 includes 8×6 pixels, the unit profile may be selected as one column of 8×1 pixels. Or, the unit profile may be selected as M×2 pixels in the column direction in the first unit block UB1 of M×N pixels. In other words, when the first unit block UB1 includes 8×6 pixels, the unit profile may be selected as 8×2 pixels in two columns. However, the unit profile should be selected to be smaller than the unit block.

Alternatively, the unit profile may be selected as 1×N pixels in the row direction from the first unit block UB1 of M×N pixels. When the first unit block UB1 includes 8×6 pixels, the unit profile may be selected as one row of 1×6 pixels. Or, the unit profile may be selected as 2×N pixels in the row direction in the first unit block UB1 of M×N pixels. In other words, when the first unit block UB1 includes 8×6 pixels, the unit profile may be selected as 2×6 pixels in two rows. However, the unit profile should be selected to be smaller than the unit block.

The step S500 of generating the deviation data of the unit profile by comparing the luminance data of the unit profiles spaced apart at the reference interval is a process of generating the deviation data of the unit profile by calculating a difference between the luminance data of the first unit profile and the luminance data of the second unit profile.

Here, the reference interval may correspond to an interval of M pixels or N pixels in the unit block of M×N pixels.

Figure 12:
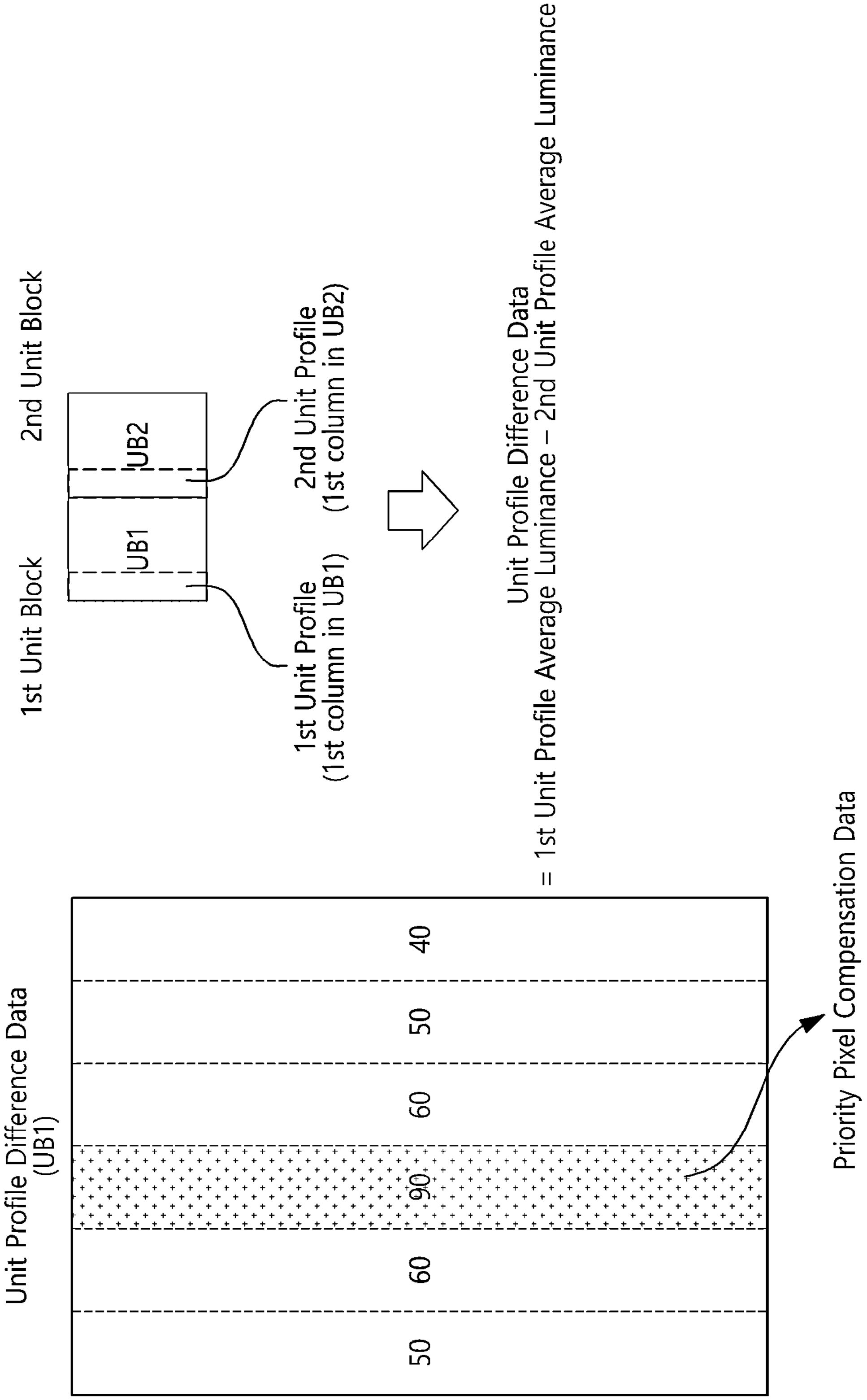
FIG. 12 illustrates a process of generating deviation data of a unit profile in a luminance uniformity compensation method according to embodiments of the disclosure.

FIG. 12 illustrates a process of generating deviation data of a unit profile in a luminance uniformity compensation method according to embodiments of the disclosure.

With reference to FIG. 12, in the luminance uniformity compensation method according to embodiments of the disclosure, deviation data of a unit profile may be generated by comparing M×1 unit profiles in the column direction positioned at intervals of N pixels with respect to adjacent unit blocks having a size of M×N pixels. In this case, the reference interval for comparing luminance data between unit profiles may be the distance of N pixels.

For example, the first column of the first unit block UB1 may be selected as the first unit profile, and the first column of the second unit block UB2 adjacent in the row direction may be selected as the second unit profile, and a difference value between the luminance data of the first unit profile and the luminance data of the second unit profile may be determined as the deviation data of the first unit profile.

In this case, the reference interval between the first unit profile and the second unit profile in the column direction may be an interval of N pixels corresponding to the row-wise size of the M×N unit block. The deviation data of the unit profiles of the N columns included in the first unit block and the unit profiles of the N columns included in the second unit block may be displayed as the deviation data of the unit profile for the first unit block. In this case, because the unit profile extends in the column direction, the deviation data of the unit profile may have the same value in the column direction in the unit block.

The step S600 of generating the pixel compensation data of the priority from the deviation data of the unit profile is a process of selecting the deviation data having the largest value among the deviation data of the unit profile in the unit block as the pixel compensation data of the priority. The pixel compensation data of the priority, together with the compensation data of the unit block, may be transmitted to the display device 100, so that the display device 100 may perform luminance compensation on the unit profile along with the luminance compensation for the unit block.

Figure 13:
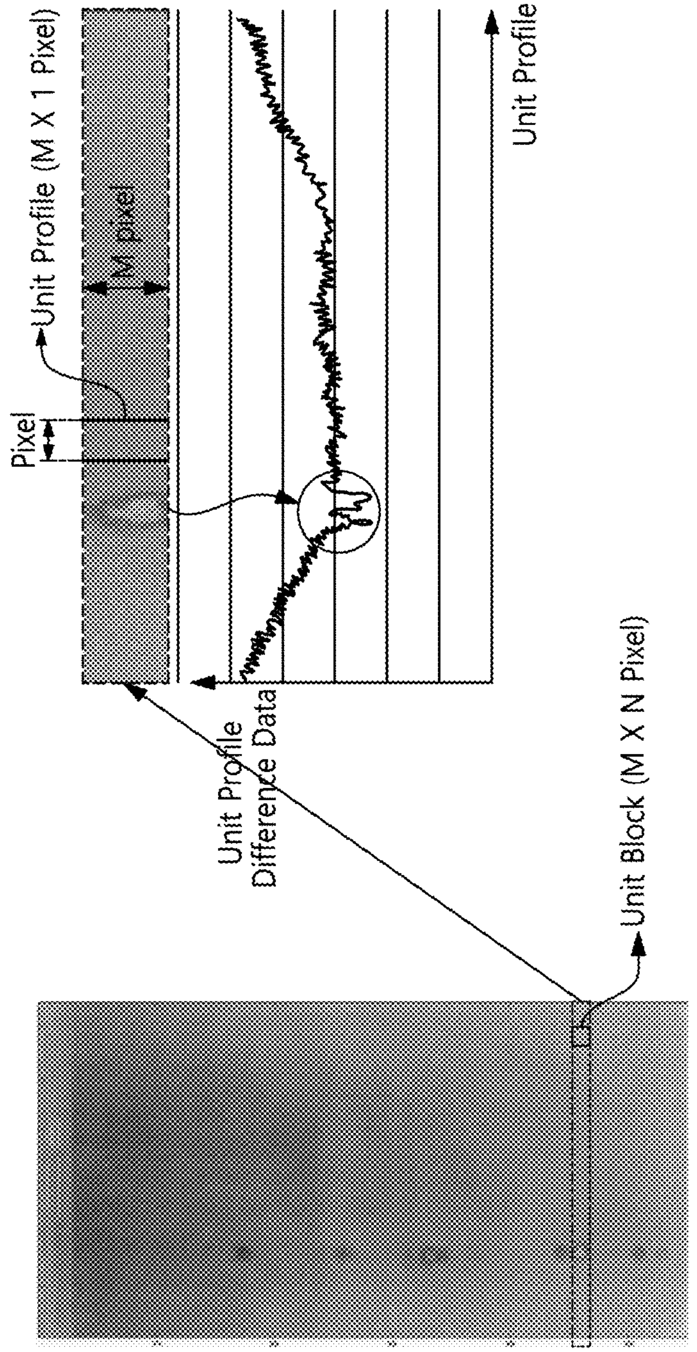
FIG. 13 is a view illustrating a process of detecting a singular point in a display panel using deviation data of a unit profile in a luminance uniformity compensation method according to embodiments of the disclosure.

FIG. 13 is a view illustrating a process of detecting a singular point in a display panel using deviation data of a unit profile in a luminance uniformity compensation method according to embodiments of the disclosure.

With reference to FIG. 13, according to the luminance uniformity compensation method according to embodiments of the disclosure, it is possible to more accurately detect a singular point, such as a black spot or a white spot, while reducing the amount of the luminance compensation data by selecting a unit profile having a predetermined direction and size in a unit block and generating deviation data by comparing luminance data of the unit profiles according to a predetermined interval.

As described above, the unit profile may be selected as pixels in the column direction, but may be selected as a pixel in the row direction.

Figure 14:
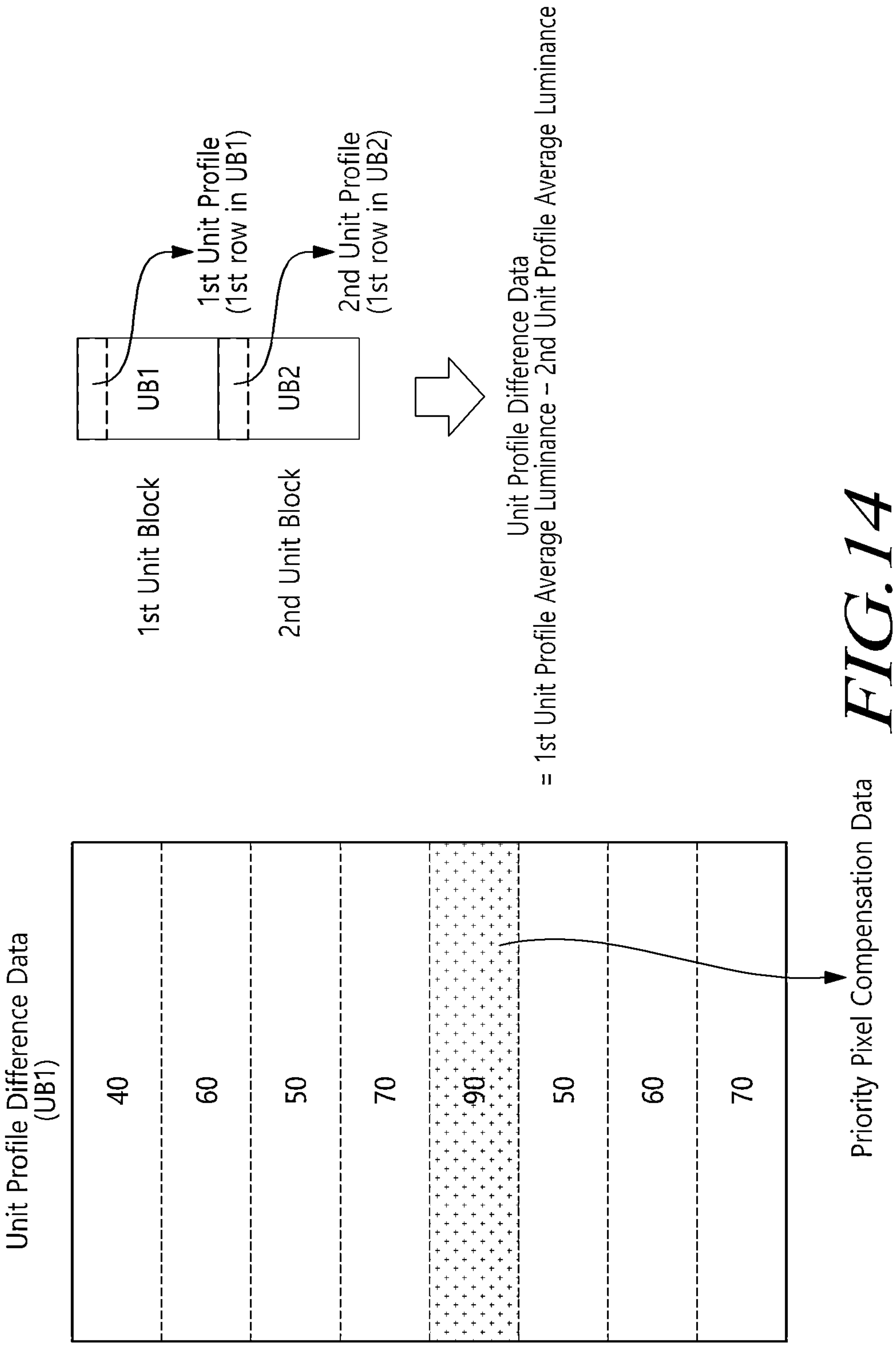
FIG. 14 is a view illustrating another method of generating deviation data of a unit profile in a luminance uniformity compensation method according to embodiments of the disclosure.

FIG. 14 is a view illustrating another method of generating deviation data of a unit profile in a luminance uniformity compensation method according to embodiments of the disclosure.

With reference to FIG. 14, in the luminance uniformity compensation method according to embodiments of the disclosure, deviation data of a unit profile may be generated by comparing 1×N unit profiles in the row direction positioned at intervals of M pixels with respect to adjacent unit blocks having a size of M×N pixels.

In this case, the reference interval for comparing luminance data between unit profiles may be the size of M pixels disposed in the column direction. For example, the first row of the first unit block UB1 may be selected as the first unit profile, and the first row of the second unit block UB2 adjacent in the column direction may be selected as the second unit profile. Then, the difference value between the luminance data of the first unit profile and the luminance data of the second unit profile may be determined as the deviation data of the first unit profile.

In this case, the reference interval between the first unit profile and the second unit profile in the row direction may be the size of M pixels corresponding to the column-wise size of the M×N unit block.

The deviation data of the M unit profiles included in the first unit block and the M unit profiles included in the second unit block may be displayed as the deviation data of the unit profile for the first unit block.

In this case, because the unit profile extends in the row direction, the deviation data of the unit profile may have the same value in the row direction in the unit block. Likewise, deviation data having the largest value among the deviation data of the unit profile in the unit block may be selected as pixel compensation data of priority.

The pixel compensation data of the priority, together with the compensation data of the unit block, may be transmitted to the display device 100, so that the display device 100 may perform luminance compensation on the unit profile along with the luminance compensation for the unit block. In this case, in the luminance uniformity compensation method according to the disclosure, deviation data of the unit profile may be generated by calculating the luminance difference between unit profiles in the column direction, or deviation data of the unit profile may be generated by calculating the luminance difference between unit profiles in the row direction.

When the deviation data of the unit profile is generated by calculating the luminance difference between the unit profiles in the column direction, the same luminance deviation is shown in the column direction in the unit block, and thus it may be identified that there is a singular point, such as a black spot or a white spot, in the unit profile in the column direction. Likewise, when the deviation data of the unit profile is generated by calculating the luminance difference between the unit profiles in the row direction, the same luminance deviation is shown in the row direction in the unit block, and thus it may be identified that there is a singular point, such as a black spot or a white spot, in the unit profile in the row direction.

Accordingly, it is possible to detect the unit profile in the row direction or the unit profile in the column direction in which the singular point is present, but it may be difficult to calculate the accurate pixel coordinates of the singular point.

Accordingly, in the luminance uniformity compensation method according to the disclosure, to calculate accurate pixel coordinates of a singular point, the luminance difference between unit profiles in the column direction and the luminance difference between unit profiles in the row direction may be calculated together to generate deviation data of the unit profile.

Figure 15:
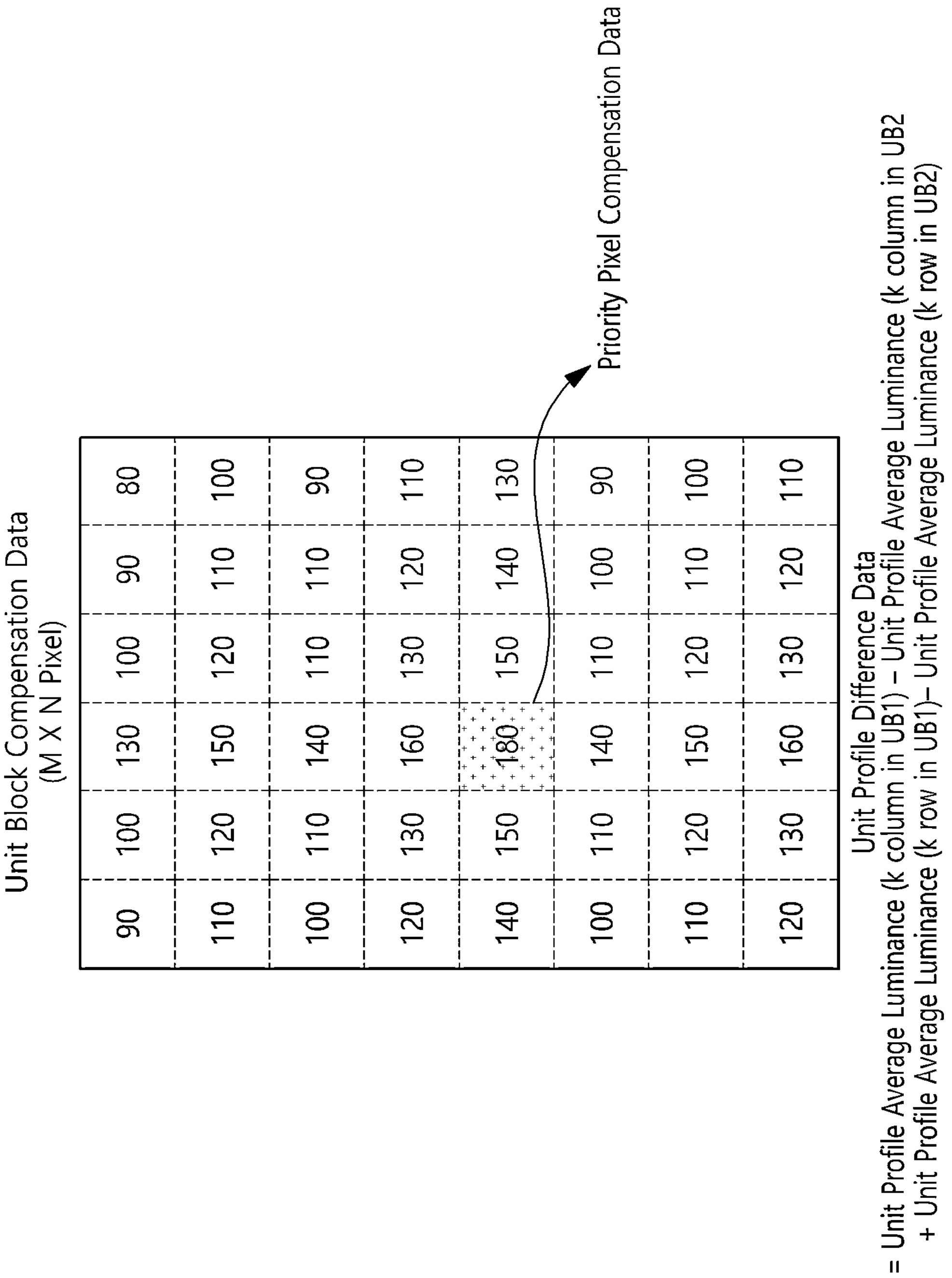
FIG. 15 is a view illustrating an example method for generating deviation data of a unit profile by calculating a difference in luminance between unit profiles in a column direction and a difference in luminance between unit profiles in a row direction together in a luminance uniformity compensation method according to embodiments of the disclosure.

FIG. 15 is a view illustrating an example method for generating deviation data of a unit profile by calculating a difference in luminance between unit profiles in a column direction and a difference in luminance between unit profiles in a row direction together in a luminance uniformity compensation method according to embodiments of the disclosure.

With reference to FIG. 15, in the luminance uniformity compensation method according to embodiments of the disclosure, deviation data of the first unit profile may be generated by calculating the luminance difference between unit profiles in the column direction, and deviation data of the second unit profile may be generated by calculating the luminance difference between unit profiles in the row direction. Then, the deviation data of the final unit profile may be generated by summing the deviation data of the first unit profile and the deviation data of the second unit profile.

As described above, when the deviation data of the first unit profile is generated using the unit profile in the column direction and the deviation data of the second unit profile is generated using the unit profile in the row direction, the luminance deviation in the row direction and the luminance deviation in the column direction are shown together in the unit block, and thus the position of the singular point, such as a black spot or a white spot, may be more accurately detected.

For example, in the first unit block UB1, deviation data of the unit profile of column k may be generated using the unit profile M×k of column k, and deviation data of the unit profile of row k may be generated using the unit profile k×N of row k. In this case, it is possible to detect an accurate luminance deviation for pixels in k row and k column.

Accordingly, the pixel having the largest deviation data of the final unit profile obtained by summing the deviation data of the first unit profile and the deviation data of the second unit profile may be selected as the pixel compensation data of the priority.

The step S700 of transmitting the compensation data of the unit block and the pixel compensation data of the priority is a process in which the uniformity compensation device 400 transmits the compensation data of the unit block and the pixel compensation data of the priority to the display device 100 through a wired network or a wireless network.

The display device 100 may not only compensate for the luminance deviation on a per-block basis using the compensation data of the unit block, but also compensate for the luminance deviation corresponding to the singular point using the pixel compensation data of the priority.

An example in which the compensation data of the unit block and the pixel compensation data of the priority are used together has been described above, but when the unit profile in the row direction or the unit profile in the column direction is used, the compensation data of the unit block may not be used, but only the pixel compensation data of the priority may be used.

In this case, the luminance uniformity may be compensated by transmitting only the pixel compensation data of the priority to the display device 100 while omitting the process of extracting the luminance data of the unit block and generating the compensation data of the unit block.

Figure 16:
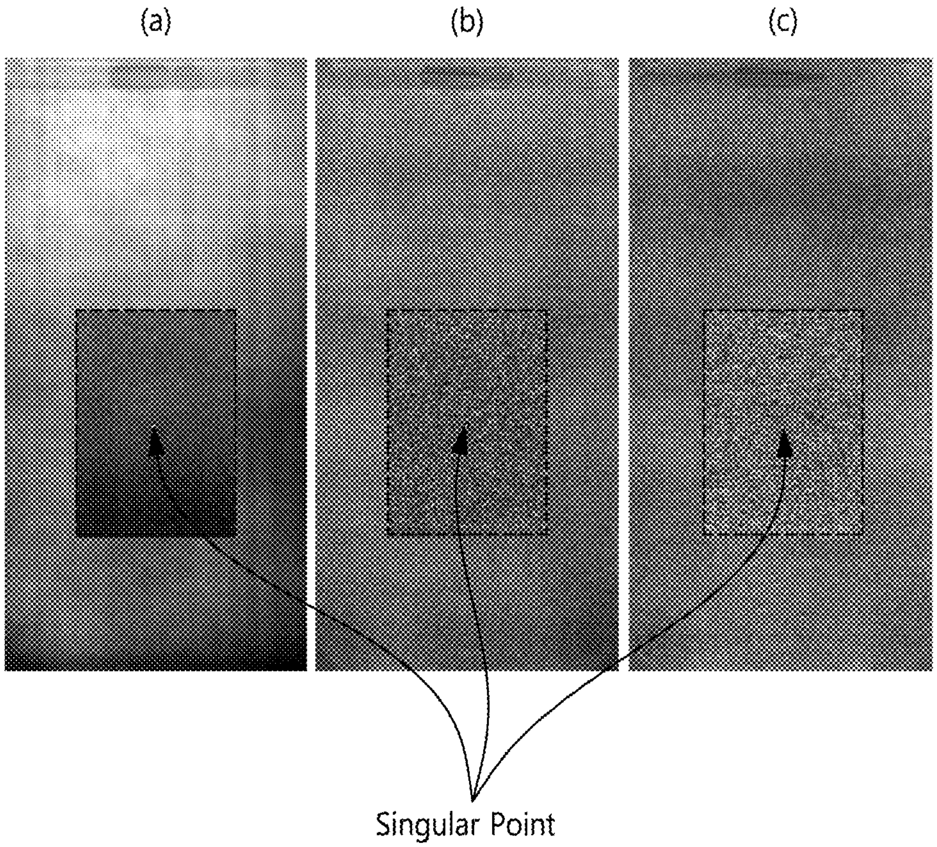
FIG. 16 is a view illustrating a comparison between a result of uniformity compensation when compensation data of a unit block is used and a result of uniformity compensation when compensation data of a unit profile is used in a uniformity compensation method according to embodiments of the disclosure.

FIG. 16 is a view illustrating a comparison between a result of uniformity compensation when compensation data of a unit block is used and a result of uniformity compensation when compensation data of a unit profile is used in a uniformity compensation method according to embodiments of the disclosure.

Portion (a) of FIG. 16(*a*) illustrates picture data obtained by capturing a display panel, portion (b) of FIG. 16 illustrates a case where luminance uniformity is compensated using compensation data of a unit block, and portion (c) of FIG. 16 illustrates a case where luminance uniformity is compensated using a unit profile in a row or column direction.

With reference to FIG. 16, in the luminance uniformity compensation method according to the disclosure, coordinates of the singular point may be accurately detected by calculating the luminance difference between unit profiles in the column direction or unit profiles in the row direction, and thus the compensation rate for luminance uniformity for the display panel may be enhanced while reducing the data amount for luminance uniformity compensation.

Embodiments of the disclosure described above are briefly described below.

A luminance uniformity compensation system according to the disclosure may comprise a display device having a display panel, a camera device generating picture data by capturing the display panel and extracting luminance data of the display panel from the picture data, and a uniformity compensation device generating compensation data of a unit block and pixel compensation data of a priority from the luminance data of the display panel and transmitting the compensation data and the pixel compensation data to the display device.

The camera device may include a camera generating the picture data by capturing the display panel, and a luminance detector extracting luminance data of each pixel disposed on the display panel from the picture data.

The uniformity compensation device may include a compensation data generator generating the compensation data of the unit block and the pixel compensation data of the priority from the luminance data of the display panel, a communication module transmitting the compensation data of the unit block and the pixel compensation data of the priority to the display device, and a controller controlling the compensation data generator and the communication module.

The uniformity compensation device may perform extracting luminance data of a unit profile smaller than a unit block including M×N (where M and N are natural numbers larger than or equal to 2) pixels from the luminance data of the display panel, generating deviation data of a unit profile by comparing luminance data between unit profiles spaced apart at a reference interval, and generating the pixel compensation data of the priority from the deviation data of the unit profile.

The uniformity compensation device may perform extracting luminance data of the unit block, and generating the compensation data of the unit block.

The compensation data of the unit block may correspond to a difference value between average luminance data of the display panel and average luminance data of the unit block.

The unit profile may include M×1 pixels.

The reference interval may be an N pixel interval in a row direction.

The unit profile may include 1×N pixels.

The reference interval may be an M pixel interval in a column direction.

The deviation data of the unit profile may be a sum of a deviation of luminance data between the unit profiles in a row direction and a deviation of luminance data between the unit profiles in a column direction.

A uniformity compensation device according to the disclosure may comprise a compensation data generator generating compensation data of a unit block and pixel compensation data of a priority from luminance data of a display panel, a communication module transmitting the compensation data of the unit block and the pixel compensation data of the priority to a display device, and a controller controlling the compensation data generator and the communication module.

The compensation data generator may extract luminance data of the display panel from picture data of the display panel provided from a camera device.

The uniformity compensation device may further comprise a memory storing the picture data, the luminance data of the display panel, the compensation data of the unit block, and the pixel compensation data of the priority.

A luminance uniformity compensation method according to the disclosure may comprise extracting luminance data of a unit profile smaller than a unit block including M×N (where M and N are natural numbers larger than or equal to 2) pixels from luminance data of a display panel, generating deviation data of a unit profile by comparing luminance data between the unit profiles spaced apart at a reference interval, and generating pixel compensation data of a priority from the deviation data of the unit profile.

The luminance uniformity compensation method may further comprise extracting the luminance data of the display panel from picture data obtained by capturing the display panel.

The luminance uniformity compensation method may further comprise extracting luminance data of the unit block, and generating the compensation data of the unit block.

It will be apparent to those skilled in the art that various modifications and variations can be made in the luminance uniformity compensation system and method of the present disclosure without departing from the technical idea or scope of the disclosure. Thus, it is intended that the present disclosure cover the modifications and variations of this disclosure provided they come within the scope of the appended claims and their equivalents.

What is claimed is:

1. A luminance uniformity compensation system, comprising:

a display device having a display panel;

a camera configured to generate picture data by capturing the display panel and extracting luminance data of the display panel from the picture data; and a uniformity compensation device configured to generate block compensation data of a unit block and priority pixel compensation data of a priority pixel of the unit block from the luminance data of the display panel and transmitting the block compensation data and the priority pixel compensation data to the display device, wherein the unit block includes a block of pixels defined within the display panel, wherein the priority pixel includes a pixel having one of a dark spot or a bright spot, and wherein the uniformity compensation device is configured to perform:

extracting luminance data of each unit profile of a plurality of unit profiles from the luminance data of the display panel, wherein the unit block is comprised of the plurality of unit profiles, wherein each unit profile is smaller than the unit block, and wherein the unit block includes M×N pixels, and M and N are natural numbers larger than or equal to 2;

generating deviation data of each unit profile by comparing luminance data between the unit profiles of the plurality of unit profiles; and generating the priority pixel compensation data from the deviation data of the unit profiles.

2. The luminance uniformity compensation system of claim 1, wherein the camera includes:

a camera module configured to generate the picture data by capturing a picture displayed on the display panel; and a luminance detector configured to extract luminance data of each pixel of the display panel from the picture data.

3. The luminance uniformity compensation system of claim 1, wherein the uniformity compensation device includes:

a compensation data generator configured to generate the block compensation data of the unit block and the priority pixel compensation data from the luminance data of the display panel;

a communication module configured to transmit the block compensation data of the unit block and the priority pixel compensation data to the display device; and a controller configured to control the compensation data generator and the communication module.

4. The luminance uniformity compensation system of claim 1, wherein the uniformity compensation device performs:

extracting luminance data of the unit block; and generating the block compensation data of the unit block.

5. The luminance uniformity compensation system of claim 4, wherein the block compensation data of the unit block corresponds to a difference value between average luminance data of the display panel and average luminance data of the unit block.

6. The luminance uniformity compensation system of claim 1, wherein each unit profile includes M×1 pixels.

7. The luminance uniformity compensation system of claim 6, wherein the unit block includes N unit profiles.

8. The luminance uniformity compensation system of claim 1, wherein each unit profile includes 1×N pixels.

9. The luminance uniformity compensation system of claim 8, wherein the unit block includes M unit profiles.

10. The luminance uniformity compensation system of claim 1, wherein the deviation data of each pixel of the unit block respectively includes a sum of a deviation of luminance data between a corresponding first unit profile in a row direction and a deviation of luminance data between a corresponding second unit profile in a column direction.

11. A uniformity compensation device, comprising:

a compensation data generator configured to generate block compensation data of a unit block and priority pixel compensation data of a priority pixel from luminance data of a display panel of a display device;

a communication module configured to transmit the block compensation data and the priority pixel compensation data to the display device; and a controller configured to control the compensation data generator and the communication module, wherein the unit block includes a block of pixels defined within the display panel, wherein the priority pixel includes a pixel among the block of pixels having one of a dark spot or a bright spot, and wherein the compensation data generator is configured to perform:

extracting luminance data of each unit profile of a plurality of unit profiles from the luminance data of the display panel, wherein the unit block is comprised of the plurality of unit profiles, wherein each unit profile is smaller than the unit block, and wherein the unit block includes M×N pixels, and M and N are natural numbers larger than or equal to 2;

generating deviation data of each unit profile by comparing luminance data between the unit profiles of the plurality of unit profiles; and generating the priority pixel compensation data from the deviation data of the unit profiles.

12. The uniformity compensation device of claim 11, wherein the compensation data generator extracts luminance data of the display panel from picture data of the display panel from a camera.

13. The uniformity compensation device of claim 11, further comprising a memory configured to store the picture data, the luminance data of the display panel, the block compensation data, and the priority pixel compensation data of the priority.

14. A luminance uniformity compensation method, comprising:

extracting luminance data of each unit profile of a unit block from luminance data of a display panel, wherein the unit block includes a block of pixels defined within the display panel, wherein the unit block is comprised of a plurality of unit profiles, wherein each unit profile is smaller than the unit block, and wherein the unit block includes M×N pixels, and M and N are natural numbers larger than or equal to 2;

generating deviation data of each unit profile by comparing luminance data between the unit profiles of the plurality of unit profiles; and generating priority pixel compensation data of a priority pixel from the deviation data of the unit profiles, wherein the priority pixel includes a pixel among the block of pixels having one of a dark spot or a bright spot.

15. The luminance uniformity compensation method of claim 14, further comprising extracting the luminance data of the display panel from picture data of the display panel obtained by a camera.

16. The luminance uniformity compensation method of claim 14, further comprising:

extracting luminance data of the unit block; and generating block compensation data of the unit block.

17. The luminance uniformity compensation method of claim 16, further comprising:

transmitting the block compensation data and the priority pixel compensation data to a display device having the display panel; and compensating display data to be input to the display panel using the block compensation data and the priority pixel compensation data.

18. The luminance uniformity compensation method of claim 14, further comprising compensating display data to be input to the display panel using the priority pixel compensation data.

* * * * *